June 16, 1931. L. A. SUEKOFF Re. 18,101

MATTRESS AND CUSHION

Original Filed June 9, 1926

Inventor
Louis A. Suekoff
By Rudolph Ansel
Attorney.

Reissued June 16, 1931 Re. 18,101

UNITED STATES PATENT OFFICE

LOUIS A. SUEKOFF, OF WILMETTE, ILLINOIS, ASSIGNOR OF ONE-HALF TO FRED A. NACHMAN, OF CHICAGO, ILLINOIS

MATTRESS AND CUSHION

Original No. 1,700,339, dated January 29, 1929, Serial No. 114,599, filed June 9, 1926. Application for reissue filed November 5, 1930. Serial No. 493,665.

This invention relates to improvements in mattresses and cushions of the spring-filled type and to methods of making the same, the objects of the invention being to provide a product of the type aforesaid which is cheap, durable and efficient and capable of being produced with a minimum of hand labor and with unskilled hand labor and to provide a method of producing the same which is rapid and cheap and which eliminates waste of materials.

The invention is fully illustrated in the accompanying drawings wherein:—

Figure 1:
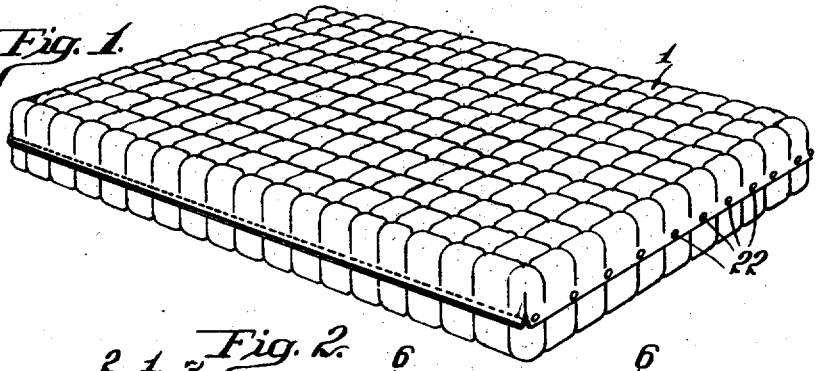
Fig. 1 is a perspective view of a mattress or cushion constructed in accordance with the invention.
Figure 2:
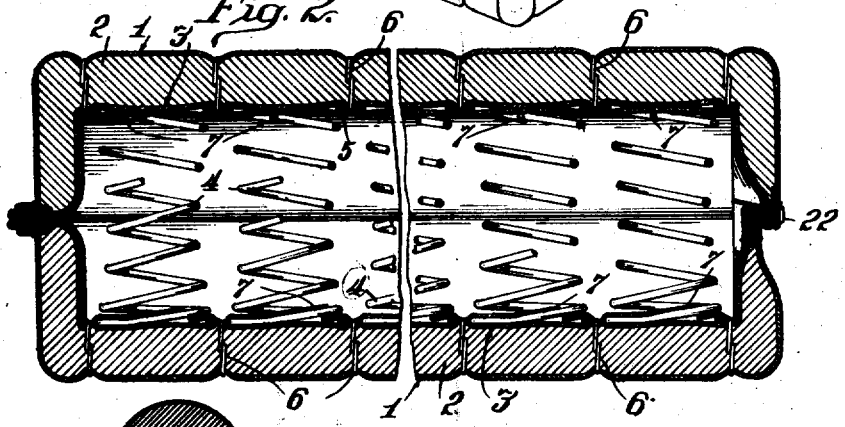
Fig. 2 is a sectional view of the same.

The invention consists essentially in producing finished padded walls for mattresses and cushions which said walls are equipped with means for engaging springs therewith to retain said walls yieldingly in spaced relation to each other and, at the same time, retaining the said springs in spaced relation to each other. The invention also comprises the method of forming said spring engaging means with its associated parts.

To this end I first produce what may be termed "quilts" the outer exposed surfaces or walls of which, when incorporated in the structure, are composed of the ticking or other desired textile fabric while their inner walls are composed of a cheap fabric or fabrics suitable to the needs of the finished structure, a pair of said quilts being disposed in opposed relation to each other and joined by means of interposed springs inwardly of their peripheral edge portions while the latter are joined to form the peripheral walls of the mattress or cushion.

The mattress or cushion comprises the padded top and bottom walls each of which consists of an outer wall 1 of textile fabric such as ticking, a layer 2 of padding material, such as cotton, a second wall 3 of textile fabric underlying the padding material, and means mounted upon the wall 3 for engaging the ends of coiled springs 4. In the instance illustrated the said means consist in a third wall 5 of fabric stitched to the wall 3 by means of intersecting lines 6 of stitching relatively arranged to provide substantially square pockets between the fabrics 3 and 5. The latter is cut preferably diagonally of the said square pockets to provide slits 7 through which the ends of the springs 4 are inserted into the said pockets.

It will be understood, of course, that other means or devices for engaging the said ends of the springs 4 may be substituted for the fabric 5, the latter and the lines of stitching 6 and slits 7 being merely exemplary of but constituting the preferred means for accomplishing my purpose.

The peripheral edge portions of the quilts formed by the padding 2 and fabrics 1 and 3, are preferably finished by stitching in any well-known manner and are subsequently secured together by stitching or other well-known means, it being merely a matter of choice on the part of the manufacturer to finish the peripheral walls of the structure as illustrated or to vary therefrom.

The ends of the springs 4 are substantially circular and flat, that is to say, the wire forms a circular loop which is not at all or only slightly helical. Said loops are easily contractible to permit them to be sprung into the pockets between the fabrics 3 and 5 through the slits 7. When said ends are engaged in said pockets it is quite impossible for them to be released or freed therefrom except by the manual operation of again contracting the said end loops and withdrawing them through the slits 7.

The employment of the slitted fabric 5 is preferred over other means for engaging the ends of the springs 4 because said fabric 5 can be secured to the fabric 3 and the latter, and the fabric 1 and padding 2, all secured together by the lines of stitching 6 which pass through all of said elements. The padding 2 is thus held against displacement far more efficiently than by means of the usual tufting and, furthermore, at far less expense.

Figure 4:
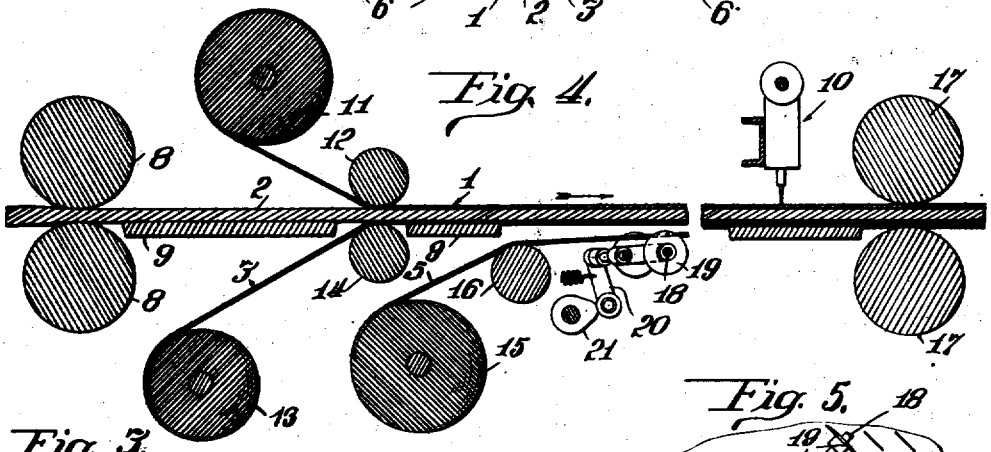
Fig. 4 is a diagrammatic view illustrative of the method of making the walls of the mattress or cushion.
Figure 3:
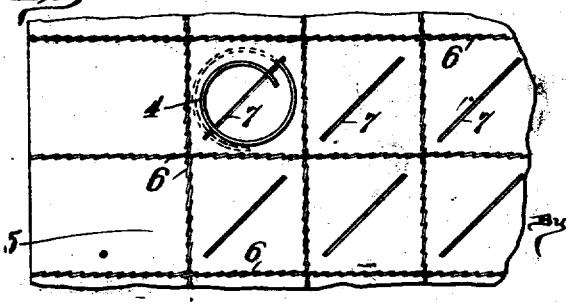
Fig. 3 is a detail fragmentary plan view of an inner face of a top or bottom wall of the mattress.
Figure 5:
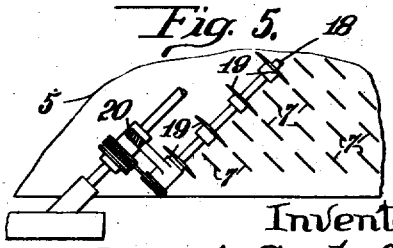
Fig. 5 is a fragmentary diagrammatic plan view of a portion of the mechanism of Fig. 4.

The quilts may be very efficiently, quickly and cheaply made in the manner illustrated in Figs. 4 and 5. A machine for producing the layer 2 of padding is diagrammatically represented by a pair of rolls 8 which feed the padding continuously upon the table 9 of the gang-needle sewing machine 10.

A roll 11 of ticking, for example, is arranged above the table and the ticking 1 passed under the roll 12. A roll 13 of bottom fabric is arranged below the table and the fabric 3 passed over a roll 14 projecting into a transverse slot in the table 9. A roll 15 of fabric, such as burlap, is arranged below the roll 14 and the fabric 5 passed over a roll 16 having its upper portion disposed approximately flush with the bottom of the table 9, the latter being provided with an opening adjacent to the roll 16 and extending well beyond the same. A pair of tension feed rolls 17 is arranged back of the sewing machine 10 for drawing the fabrics 1, 3 and 5 and the padding 2 at the requisite speed through the machine 10, the latter producing the longitudinal lines of stitching 6.

Between the rolls 16 and 17 there is provided a high-speed shaft 18 extending at an angle of forty-five degrees to the direction of travel of the fabrics and padding. This shaft carries the cutting disks 19 and is given an up and down reciprocatory movement in the before mentioned opening in the table provided for this purpose by means, for example, of bell-crank levers 20 which carry the bearings for said shaft 18 and which may be suitably associated with the rolls 17 by means of a cam 21, to effect upward movements of said shaft and the cutting of slits 7 in the fabric 5 at proper intervals. The fabric 5 is thus slitted before it is stitched to the fabric 3.

By giving the threads of the end needles of the gang of the machine 10 far higher tension than the threads forming the intermediate lines of stitching, the peripheral edge portions of the quilting can be rendered quite thin and said edge portions may be nicely finished by suitable manipulation of the side edge portions of the fabric in advance of the needles of the machine 10.

It will be appreciated that any mechanic skilled in the sewing machine art may supply the details of the mechanism which are omitted from illustration herein.

The quilting delivered from the machine 10 is suitably cut into desired lengths and the latter then passed transversely of the direction of travel through the machine 10, through another similar gang-needle sewing machine for incorporating the transverse lines of stitching in proper relation to the slits 7 of the fabric 5.

The springs 4 are then associated with a pair of opposed quilts by manual operation easily and quickly effected by unskilled labor and the peripheral edge portions of said quilts then properly overlapped and stitched together by a sewing machine.

Preferably these edges at one side or end of the mattress or cushion are left detached from each other and equipped with fastening devices 22, such as glove-fasteners, for example, so that the mattress may be opened up for cleansing internally by means of a vacuum cleaner, the hose of which may be easily passed between adjacent rows of springs 4.

By means of the foregoing method I eliminate several operations necessary to the production of spring-filled mattresses as heretofore practiced. That practice has been to first produce the spring assembly consisting of the fabric housing for the springs. This housing with its springs is then covered on all sides with the padding and a mattress cover then drawn over the padded assembly. The open end of the cover is then closed by stitching or otherwise and thereupon the structure is tufted by hand, highly skilled and expensive labor being required for these operations.

The cutting disk mechanism of the machine herein diagrammatically illustrated, may, together with the sewing machine, in so far as these mechanisms cooperate to secure to the fabric 3 the means or devices for attaching the springs 4 to the opposed faces or walls of the quilts forming the top and bottom walls of the mattress or cushion, be regarded as the means or mechanism for securing to said fabric 3 any sort of devices for attaching the springs thereto, the invention being not limited to the particular means herein shown and described.

I claim as my invention:—

1. In mattress or cushion manufacture, the method of simultaneously forming from suitable material a relatively outer element, and from suitable fabric forming and slitting a relatively inner means for detachably engaging the ends of springs while the fabric is under a feeding tension, and then while the fabric is still under said tension stitching through the same and said relatively outer element on lines beyond the slits to partially define pockets for spring ends.

2. In mattress or cushion manufacture, the method of simultaneously forming from suitable materials a padding element and a spring attaching element in superposed relation while the latter has an advancing movement, slitting the spring attaching element during said movement for the reception of spring ends, and effecting the securing of the padding and spring attaching elements in operative association during an advancing movement of both, and applying the springs thereto.

3. In mattress or cushion manufacture, the method of simultaneously forming from suitable materials a padding element and a spring attaching element of adjacent layers of fabric in superposed relation while the latter has an advancing movement, slitting the inner layer during said movement and while spaced from the outer layer for the reception of spring ends, and effecting the securing of the padding and spring attaching elements in operative association during an advancing movement of both, and applying springs thereto.

4. The method of making mattresses and cushions of the spring filled type which consists in first making padded quilts adapted to form the walls of a structure and simultaneously with the construction of said quilts attaching thereto means for detachably engaging the same with the ends of the springs, and thereafter attaching said quilts to said springs.

5. The method of making cushion structures which includes disposing upon one face of a fabric sheet a layer of padding material and disposing upon the other face thereof fabric means for engaging springs with said fabric sheet, then passing stitch-chains through said layer of padding material, said fabric sheet and said fabric means to simultaneously permanently assemble the same, and engaging springs with said fabric means.

6. The method of making cushion structures which includes disposing over one face of a sheet of textile fabric a layer of padding material, disposing upon the other face of said sheet fabric means for cooperation with said fabric sheet to engage springs therewith, and then passing stitch chains through said layer of padding material, said fabric sheet and said fabric means simultaneously to permanently assemble the same, and engaging springs with said assembled structure.

7. The method of making cushion structures which includes disposing over one face of a sheet of textile fabric a layer of padding material, disposing upon the other face of said sheet fabric means for cooperation with said fabric sheet to engage springs therewith, then passing a set of parallel stitch chains through said padding material, said fabric sheet and said fabric means longitudinally of said sheet, then passing a second set of parallel stitch chains through said padding, said sheet and said fabric means transversely of said sheet, and engaging springs with said assembled structure.

8. The method of making cushion structures which consists in feeding a long strip of fabric web, a long layer of padding material disposed upon one face of said strip and a second sheet of fabric disposed upon the other face of said strip, simultaneously over a table, cutting rows of slots into the last-named fabric sheet at regular intervals during travel of said sheet, then passing parallel stitch chains simultaneously through said layer of padding and said fabric sheets to assemble the same with the stitch chains disposed between the rows of slots in said slotted fabric sheet longitudinally and transversely of said several sheets to form thereby flat fabric pockets between said fabric sheets, and then inserting the end coils of springs into pockets through the said slots.

LOUIS A. SUEKOFF.